United States Patent
Mussman et al.

(10) Patent No.: US 7,075,922 B2
(45) Date of Patent: Jul. 11, 2006

(54) SCREENING INBOUND CALLS IN A PACKET-BASED COMMUNICATIONS NETWORK

(75) Inventors: Harry Edward Mussman, Bedford, MA (US); Tanushree Singh, Brookline, MA (US); John Joseph McCabe, Billerica, MA (US)

(73) Assignee: Level 3 Communications, Inc., Broomfield, CO (US)

( * ) Notice: Subject to any disclaimer, the term of this patent is extended or adjusted under 35 U.S.C. 154(b) by 962 days.

(21) Appl. No.: 09/843,787

(22) Filed: Apr. 30, 2001

(65) Prior Publication Data
US 2002/0159440 A1 Oct. 31, 2002

(51) Int. Cl.
*H04L 12/66* (2006.01)
*H04L 12/28* (2006.01)

(52) U.S. Cl. ...................................... 370/352; 370/401
(58) Field of Classification Search .............. 370/352, 370/401, 389, 392, 466, 467; 709/310, 249; 713/153; 379/88.17; 711/104
See application file for complete search history.

(56) References Cited

U.S. PATENT DOCUMENTS

| | | | | |
|---|---|---|---|---|
| 6,804,224 B1 * | 10/2004 | Schuster et al. | ............ | 370/352 |
| 2001/0043577 A1 * | 11/2001 | Barany et al. | ............... | 370/328 |
| 2002/0101860 A1 * | 8/2002 | Thornton et al. | ........... | 370/352 |
| 2002/0112073 A1 * | 8/2002 | MeLampy et al. | .......... | 709/240 |
| 2002/0116464 A1 * | 8/2002 | Mak | ........................... | 709/206 |

* cited by examiner

*Primary Examiner*—Duc Ho
(74) *Attorney, Agent, or Firm*—Faegre & Benson LLP (57) ABSTRACT

A method and system is provided for performing inbound call screening in a packet-based network, such as an H.323 Voice over IP (VoIP) network. The inbound gateways on the network are registered with inbound gatekeepers, and standard messages are used between an inbound gateway, an inbound gatekeeper and an inbound screening database to decide: whether an inbound call to a particular called number (DID) is to be allowed into the network; whether the called number should be translated into a different called number; and whether a routing index should be included in the called number to indicate the destination of the call.

31 Claims, 11 Drawing Sheets

SCREENING INBOUND CALLS IN A PACKET-BASED COMMUNICATIONS NETWORK

TECHNICAL FIELD

This invention relates to call routing and control in packet-based networks, and more particularly to call screening in a packet-based voice transmission system, for example, Voice over Internet Protocol (VoIP).

BACKGROUND

For many years, the Public Switched Telephone Network (PSTN) has provided a reliable mechanism for transmitting voice communications. However, the reliability of conventional telephone networks comes at high cost. Each established communication link in a conventional telephone network, reserves a bandwidth of 64 kbps for the duration, regardless of the bandwidth actually needed for the communications. A conventional telephone communication link uses a bandwidth of 64 kbps for all transmissions.

In contrast, conventional data communication networks are packet-based with no guarantee of reliability. In such a network, bandwidth is available on a first-come, first-serve basis. In a conventional packet-based network, voice communications may be broken into multiple packets. Packets are transmitted and then reassembled at the destination. Because packets may be lost or may arrive out of sequence, the quality of voice communications may suffer.

In the last few years, efforts have been made to converge data, voice, and video communications in a single network. For example, the International Telecommunication Union Telecommunication Standardization Sector (ITU-T) released the H.323 specification for transmitting audio, video, and data across an Internet Protocol (IP) network.

SUMMARY

A call screening database device is provided for use in a packet-based communication network (e.g., a Voice over IP network). The call screening database includes one or more communication devices providing access to a gatekeeper. A memory device in the call screening database devices includes a screening database. A processor receives a request from the gatekeeper through a communication device and responds to the request by querying the screening database, determining a response to the received request, and sending the response to the gatekeeper.

In some implementations of the call screening database device, the communication devices include a connection to a packet-based network, for example, an Internet protocol (IP) network. The memory device may include random access memory (RAM) and/or a computer harddrive. The screening database may be implemented using a flat file, relational, and/or object-oriented database.

In some implementations, the received request includes a dialed number. A response to a received request includes determining whether the received request is permitted and creating a response number using the dialed number and the received request. The response number may include a routing index and may be sent with the returned response.

The details of one or more implementations are set forth in the accompanying drawings and the description below. Other features and advantages will be apparent from the description and drawings, and from the claims.

DETAILED DESCRIPTION

Voice over Internet Protocol (VoIP) networks provide one mechanism to transmit voice communication over packet-based networks. The International Telecommunications Union Telecommunication Standardization Sector (ITU-T) has published the H.323 standard for implementing VoIP systems. VoIP networks may be integrated with the Public Switched Telephone Network (PSTN) to provide connectivity between VoIP terminals and traditional telephones connected to the PSTN.

Figure 1:
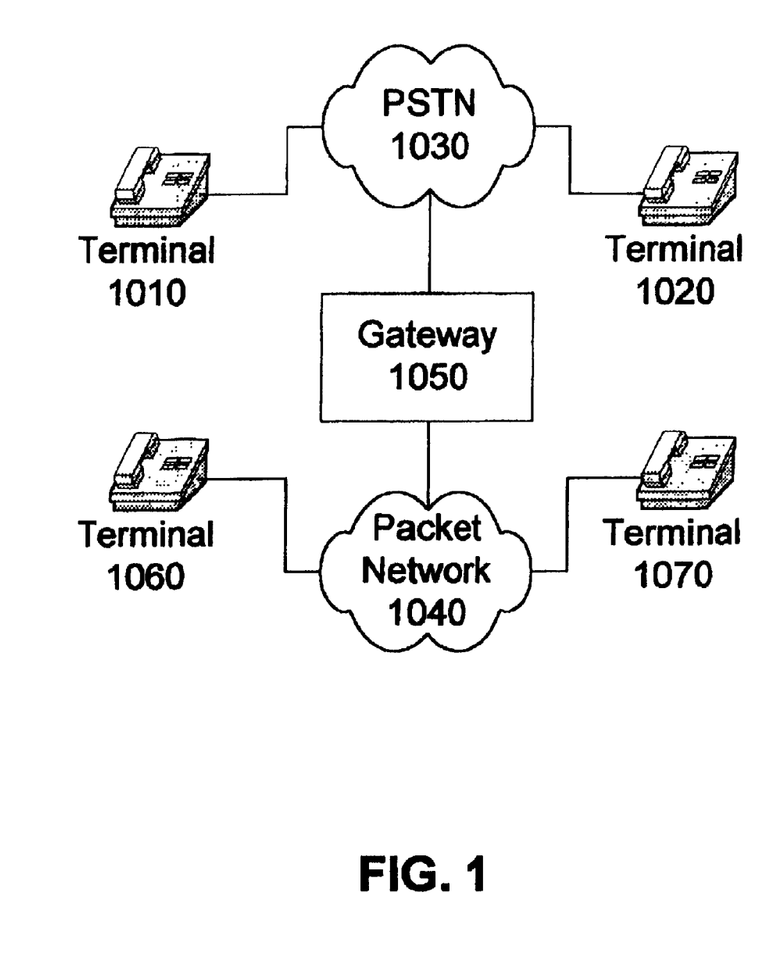
FIG. 1 is a block diagram of a hybrid communication network providing connectivity between a Public Switched Telephone Network (PSTN) and a packet-based network.

Referring to FIG. 1, terminals 1010 and 1020 connect to PSTN 1030 through a communication link, for example, one or more wires, a wireless link, and/or a fiber optic cable. Terminals 1010 and 1020 may transmit data across the communication link using analog or digital signals. Generally, a terminal is connected to the PSTN 1030 through analog, Integrated Services Digital Network (ISDN), or through a T1 carrier.

Packet network 1040 connects to PSTN 1030 through gateway 1050. Terminals 1060 and 1070 connect to packet network 1040 using any networking technology, for example, Ethernet, Asynchronous Transfer Mode (ATM), wireless network connection, and/or modem. Terminals 1060 and 1070 may be implemented using any device capable of sending and receiving audio, for example, as telephones, computers, personal digital assistant (PDA), laptop computer, and/or cellular phone.

The configuration shown in FIG. 1 permits voice communication between any of the terminals 1010, 1020, 1060, and 1070. Thus, voice communication may be transmitted from terminal 1010 to terminal 1060 across PSTN 1030 through gateway 1050 to packet network 1040.

Figure 2:
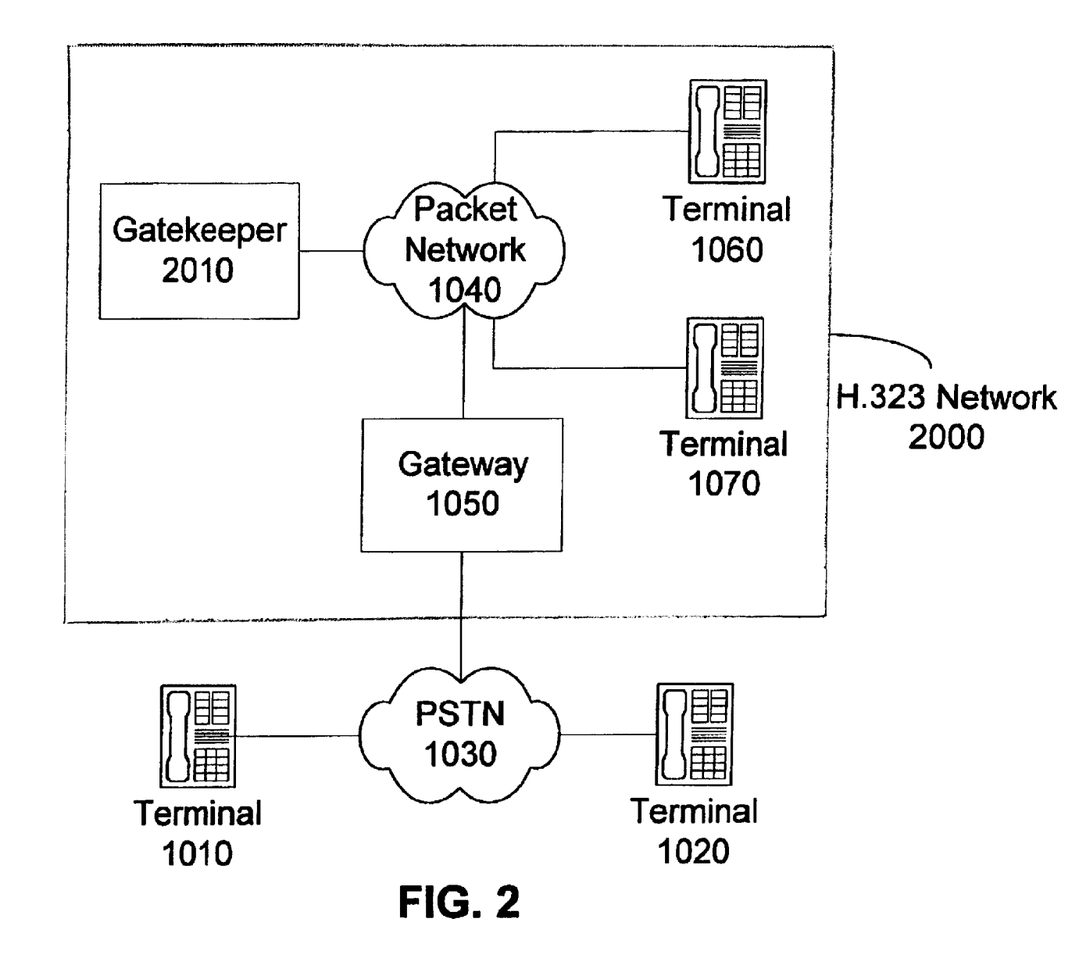
FIG. 2 is a block diagram of an H.323 implementation of a hybrid communication network such as that shown in FIG. 1.

Referring to FIG. 2, an H.323 implementation of the network described in FIG. 1 includes a H.323 network 2000 connected to PSTN 1030 through gateway 1050. The H.323 network 2000 includes terminals 1060 and 1070, Packet Network 1040, and gateway 1050 as described above with reference to FIG. 1. In addition, H.323 network 2000 includes gatekeeper 2010. The H.323 standard defines call signaling and control, multimedia transport and control, and bandwidth control for point-to-point and multipoint conferences.

Gatekeeper 2010 provides pre-call and call-level control services to H.323 terminals. For example, one implementation of gatekeeper 2010 provides the following services: (1) address translation to resolve endpoint Internet Protocol (IP) addresses from aliases or standard phone numbers; (2) admissions control to restrict access to terminals or gateways; (3) bandwidth control to manage endpoint bandwidth requirements; (4) zone management capabilities for terminals, gateways, and other devices within a H.323 zone; and (5) call management capabilities, for example, maintaining a list of active calls so that the gatekeeper can determine if a terminal or endpoint is busy.

Figure 3:
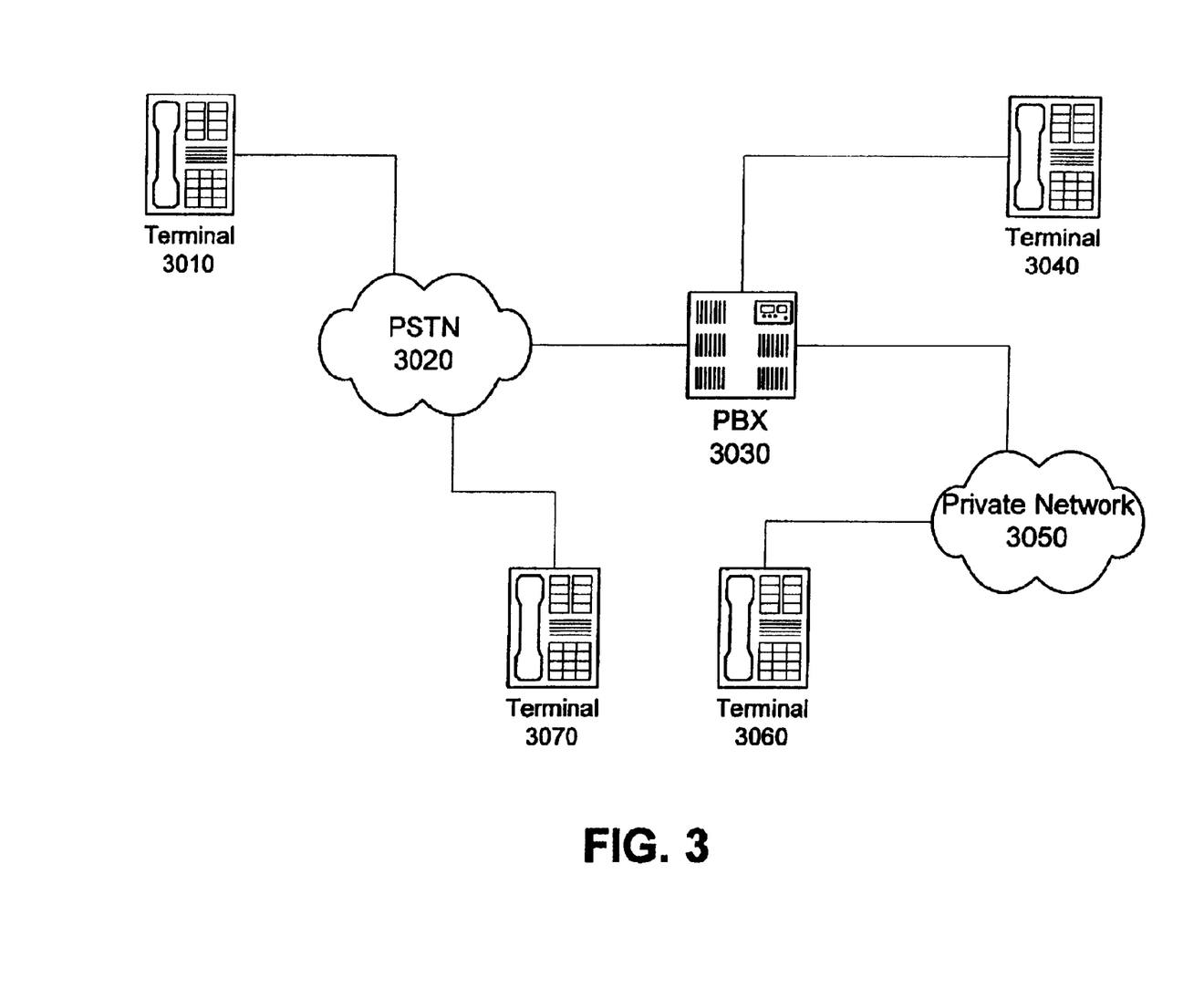
FIG. 3 is a block diagram of a communication network illustrating direct inward dialing.

Referring to FIG. 3, direct inward dialing (DID) provides a mechanism to translate a dialed number to another number. Initially, DID allowed callers on an external communications network to dial a telephone number that would in turn connect to a local extension within another communications network. For example, a caller dialing "202-555-1234" from terminal 3010 may have a call routed across PSTN 3020 to private branch exchange (PBX) 3030. In this example PBX 3030 translates all dialed telephone numbers from incoming calls to "55xx" where "xx" represents the last two digits of the dialed number. Thus, the dialed number is translated to local extension "5534" by PBX 3030. The call is completed to terminal 3040 corresponding to extension 5534.

Some DID implementations provide for the translation of dialed numbers to extensions that are not local to PBX 3030. For example, DID may translate "202-555-1234" to "617-555-1234" which in turn could be routed across private network 3050 to a terminal (e.g., terminal 3060) or across PSTN 3020 to a terminal (e.g., terminal 3070). Various DID implementations provide arbitrary translation of dialed numbers to either local or external extensions.

In a VoIP context, the PBX functionality described above may be implemented by a gatekeeper such as that described above with reference to FIG. 2. In a VoIP system, call screening may also be used to select the appropriate routing index (sometimes referred to as a technology prefix or a tech prefix) to distinguish between various gateways having specific capabilities within a given VoIP zone. For example, a routing index may be used to designate a capability such as a facsimile transmission, video conferencing, or data communications. Routing indexes are often represented by a string of digits ending in a "#" sign. For example, "12#" may represent a facsimile transmission. Thus, a DID may be used to translate a dialed number, such as "202-555-1234", to local extension, such as "5534", and to translate another dialed number, such as "202-556-1234", to the same local extension through a gateway with facsimile transmission capabilities by adding a routing index, such as "12#5534".

The routing index may also be used to indicate a particular gatekeeper to be used to complete a call. For example, a dialed number "202-555-1234" may be translated to "4#202-555-1234" indicating that a particular gatekeeper servicing a customer corresponding to the dialed number will be used to complete a call.

The demands of gatekeeper 2010 grow as the number of DID translations increases. Additionally, the management complexity increases as the number of gatekeepers increases. It may be advantageous to manage a single call screening databases that may be queried by various gatekeepers.

Figure 4:
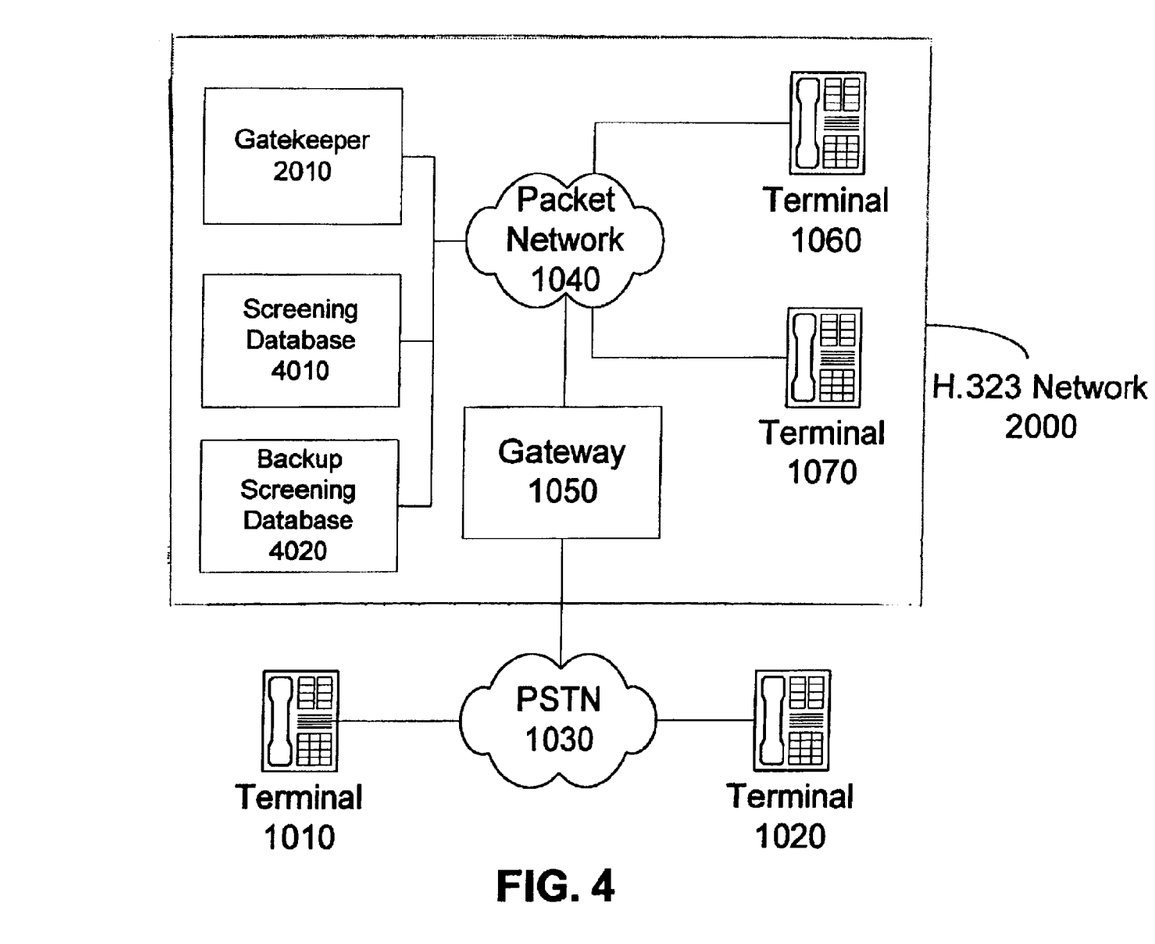
FIG. 4 is a block diagram of an H.323 implementation of a hybrid communication network such as that shown in FIG. 1 that includes a screening database.

Referring to FIG. 4, a VoIP communication network such as that described with reference to FIG. 2 may be used to implement a screening database 4010. In this example, gatekeeper 2010 may query the screening database 4010 to perform call screening. Call screening allows gatekeeper 2010 to decide: (1) whether an inbound call to a particular called number (DID) is to be allowed into the network; (2) whether the called number should be translated into a different called number; and (3) whether a routing index should be included in the called number to indicate the destination of the call. In the case of a small network, this can often be done within the inbound gateway, using configuration data stored within the gateway. In a large network with many called numbers (DID translations), the size of the configuration data may be limited by gateway resources. Therefore, in a large network, it may be advantageous to implement call screening using a centralized database that may be queried using standard network messages without requiring special proprietary messages.

Additionally, it may be advantageous to increase communication network redundancy to decrease the likelihood of downtime resulting from an outage of screening database 4010. One mechanism that may be used is to provide one or more backup screening databases 4020. Screening database 4010 and backup screening databases 4020 reside on one or more machines, for example, computer or network devices. In some implementations, the screening database 4010 and backup screening databases 4020 may reside on a gateway or gatekeeper device. Gatekeeper 2010 may be configured to query backup screening database 4020 if screening database 4010 is not able to respond. Additionally, load may be distributed and balanced in any conventional manner (i.e., round robin, random, least load).

Figure 5:
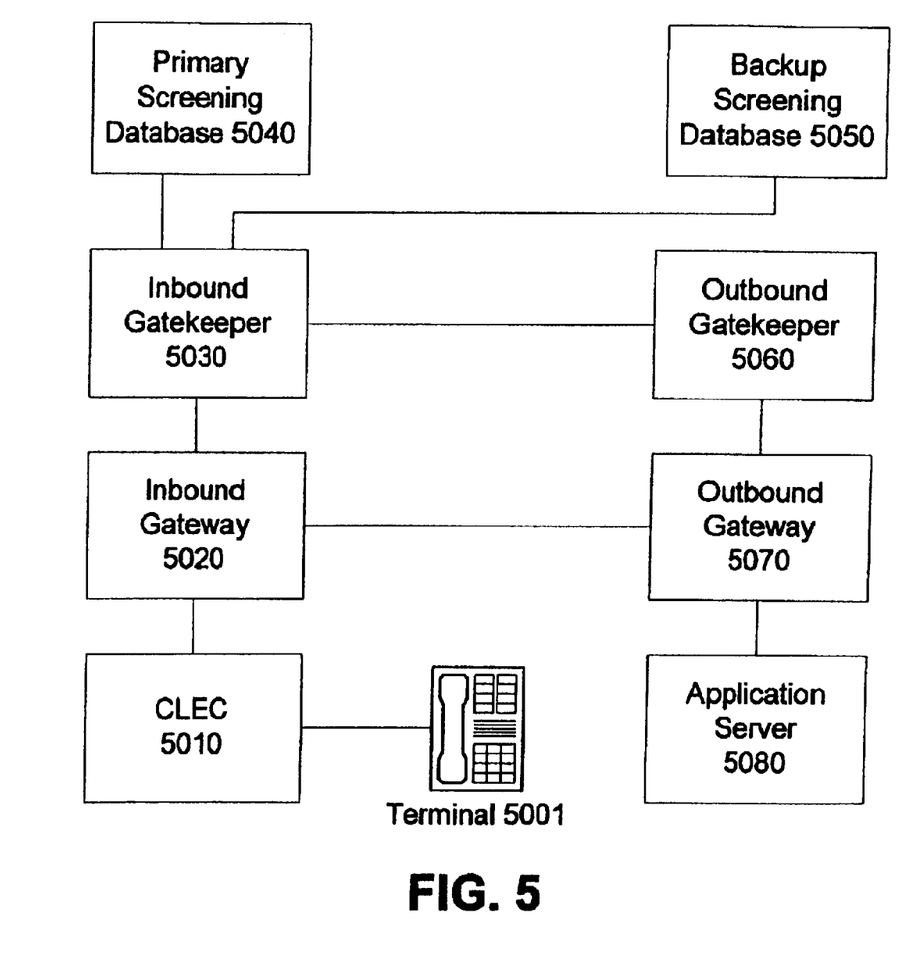
FIG. 5 is a block diagram of a packet-based communication network utilizing a screening database.

Referring to FIG. 5, a packet-based communication network includes a call screening database facilitating call screening functionality such as that described above with reference to FIG. 4. In this implementation, any terminal (e.g., terminal 5001) may connect through a communication network (e.g., competitive location exchange carrier (CLEC) 5010). This implementation is merely given as an example, calls may originate from any other devices including, but not limited to, a computer, a cellular phone, and/or a landline phone. Additionally, calls may be routed through any communications network including, but not limited to, a CLEC (such as CLEC 5010), a local area network (LAN), a wide area network (WAN), a wireless network, a cellular network, a public switched telephone network (PSTN), and/or a cable network.

An incoming call is initiated through inbound gateway 5020. Inbound gatekeeper 5030 provides pre-call and call-level control services in a packet-based communication network such as an H.323 network. Information pertaining to call screening such as direct inward dialing (DID) translations may be made using primary screening database 5040. Some implementations may include one or more backup screening databases 5050 to provide redundancy and/or load distribution.

After call screening services have been performed, the call may be completed through an appropriate outbound gateway 5070 using outbound gatekeeper 5060. The call may be terminated to any device, such as, application server 5080, a telephone, a computer, a cellular phone, and a videoconferencing unit. Application server 5080 provides an interactive voice response (IVR) system to provide automated information delivery and/or call routing. Calls may be terminated to any other communication device including but not limited to a telephone, a cellular phone, a personal digital assistant (PDA), a computer, and/or a videoconferencing unit.

FIG. 5 illustrates exemplary network connections between devices to emphasize some of the possible interactions that may occur. In operation, the gateway machines (i.e., inbound gateway 5020 and outbound gateway 5070) include network interfaces that may be connection to multiple communication networks. Any network configuration may be used so long as the devices are able to communicate as described below. For example, primary screening database 5040, backup screening database 5050, inbound gatekeeper 5030, and inbound gateway 5020 each may be connected to an Ethernet hub or switch. These devices may also reside on separate networks.

Figure 6:
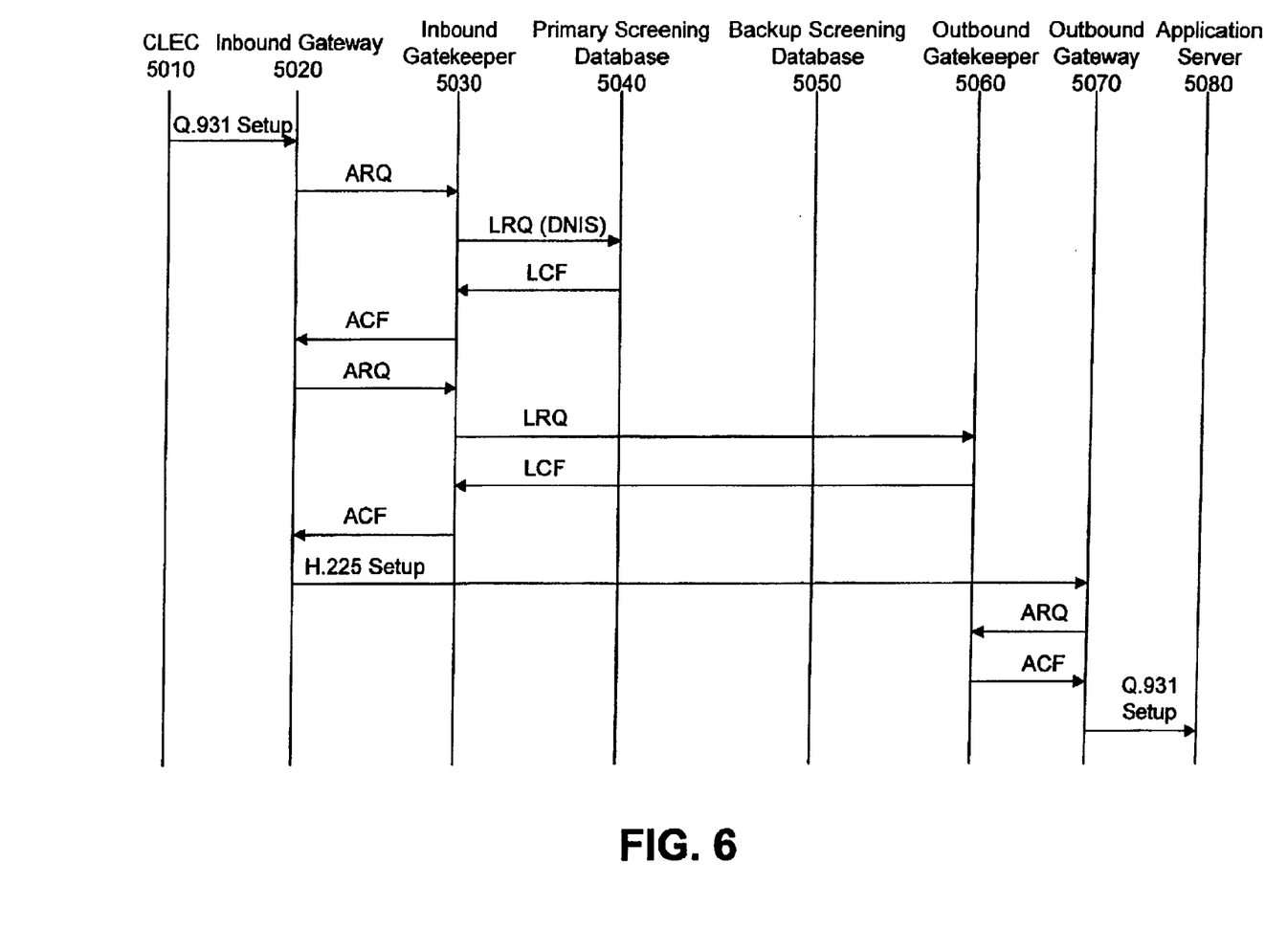
FIG. 6 is a diagram of an exemplary call sequence showing the interactions between various components in a packet-based communication network such as that shown in FIG. 5.

FIG. 6 describes an exemplary call sequence that may occur in the network described above with reference to FIG. 5. CLEC 5010 sends a setup message to inbound gateway 5020. In some implementations, this message is a Q.931 setup message. The setup message is received by inbound gateway 5020. If inbound gateway 5020 does not know where to route the call, it applies a routing index that instructs inbound gatekeeper 5030 to send a location request (LRQ) message to the screening database. Inbound gateway 5020 does this by sending an admission request (ARQ) message to inbound gatekeeper 5030. The inbound gatekeeper 5030 receives the request and performs a query of the call screening database. If the call screening database is not local to inbound gatekeeper 5030 or if an additional external call screening database is provided, inbound gatekeeper 5030 sends a location request (LRQ) message to the primary screening database 5040. The LRQ message contains at least an identification of the number dialed for lookup in the primary screening database 5040.

When a screening database 5040 or 5050 receives a LRQ message, it checks the called number, which may be transmitted using the Dialed Number Identification Service (DNIS), and decides whether the inbound call to the particular called number (DID) is to be allowed into the network; whether the called number should be translated into a different called number; and whether a routing index should be included in the called number to indicate the destination of the call.

The primary screening database 5040 receives the LRQ message, performs a database lookup, and returns a result. If the call is allowed, the primary screening database 5040 returns a location confirm (LCF) message; if the number is to be translated, it changes the called number to the translated number; it includes the appropriate routing index to indicate the destination of the call, such as an application server; and it sets the returned IP address to zero to indicate to the inbound gateway that it is to substitute the new called number and index for the original number and index, and start the call over again. The inbound gatekeeper can then use the new index to get the IP address of the destination, typically a server; this is done with the LRQ and the returned LCF message. When the inbound gatekeeper 5030 returns this IP address to the inbound gateway using ACF message, it uses the new called number in the setup message to the outbound gateway 5070.

For example, in the implementation described above, the dialed number "202-555-1234" is translated to local extension "5534". The translated number (i.e., "5534") is returned in the LCF message. If the primary screening database 5040 determines that the call cannot be completed, it returns a location reject (LRJ) message. Alternately, it may return a routing index that will be used to route the call to an announcement before terminating the call. LRJ messages may be sent when external calls to a specific DID are not allowed.

If inbound gatekeeper 5030 receives a LRJ message back from primary screening database 5040, then inbound gatekeeper 5030 sends a corresponding admission reject (ARJ) message to inbound gateway 5020. If inbound gatekeeper 5030 receives a LCF message from primary screening database 5040, then inbound gatekeeper 5040 sends an admission confirm (ACF) message to inbound gateway 5020. The ACF message may contain all of the information in the LCF message, for example, the translated dialed number may be included in the ACF message.

Once inbound gateway 5020 has received an ACF message, the call setup continues. For example, inbound gateway 5020 may send another admission request (ARQ) message to inbound gatekeeper 5030 with the translated dialed number. When the inbound gateway receives an ACF message with the IP address equal to zero, it knows that it should replace the original called number with the translated called number, and the new index. Then, it can start the call again, and send a query to the inbound gatekeeper with the new called number and the new index. Then, inbound gatekeeper 5030 sends a location request (LRQ) message to outbound gatekeeper 5060. If the call is accepted, outbound gatekeeper 5060 returns a location confirm (LCF) message to inbound gatekeeper 5030 and inbound gatekeeper 5030 sends a corresponding admission confirm (ACF) message to inbound gateway 5020.

Finally, call setup resumes with inbound gateway 5020 sending a call setup message to outbound gatekeeper 5060. This message may be in accordance with the H.225 call setup protocol. Outbound gatekeeper 5060 may then send an admission request (ARQ) message to outbound gateway 5070. If outbound gateway 5070 allows the call, an admission confirm (ACF) message is sent from outbound gateway 5070 to outbound gatekeeper 5060. Finally, outbound gateway 5070 sends a call setup message to a destination terminal such as application server 5080. This call setup message may be in accordance with the Q.931 protocol.

Some call screening implementations use an IP address of all zeros to indicate that a call is to be restarted using the translated called number. The use of an IP address of all zeros is arbitrary; additional implementations may choose an IP address such as 255.255.255.255 or may provide restart indication in other ways, for example, restart messages may be indicated by modifying the gateway protocols to explicitly support a restart flag.

Figure 7:
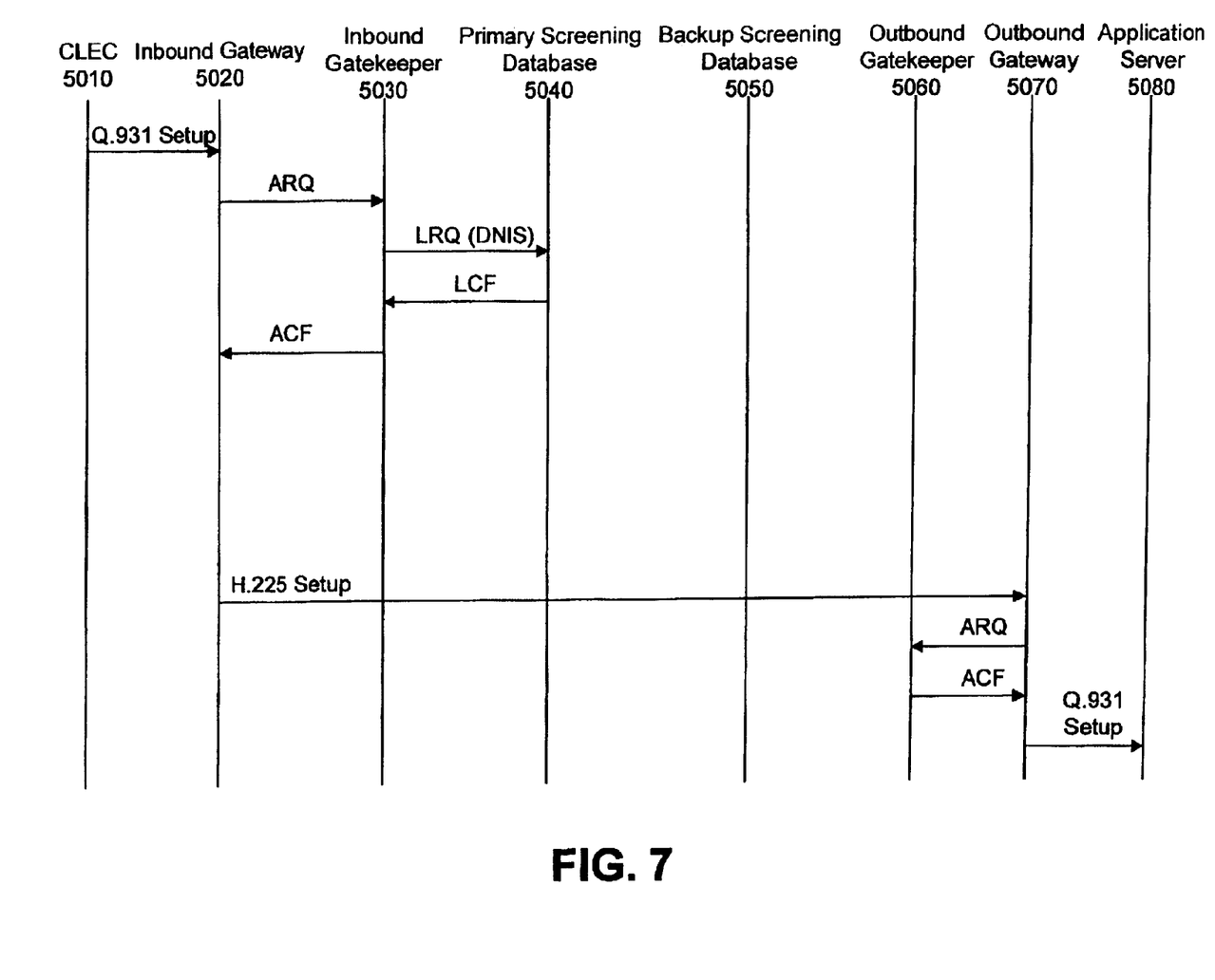
FIG. 7 is a diagram of an exemplary call sequence such as that shown in FIG. 6 showing an implementation providing direct translation of routing indexes without requiring additional queries.

FIG. 7 describes an exemplary call sequence similar to that described above with reference to FIG. 6. In some implementations, an inbound gateway 5020 receiving an ACF message containing a number with a routing index may be able to check its own database and translate the routing index directly into a network address, such as an Internet Protocol (IP) address, of the destination outbound gateway 5070. In this case, inbound gateway 5020 sends a setup message directly to outbound gateway 5070.

The inbound screening database can be centralized in the network. A secondary database may be provided for redundancy, and sequential LRQs from the inbound gatekeeper may be used to query the second database if no response is obtained from the first database within a certain time. That is, if the first database fails to respond to an LRQ message, then a second LRQ message may be automatically sent to the secondary database.

If the primary database becomes too busy in a large network, additional databases may be added, dedicated to serving only certain inbound gatekeepers. Thus, the inbound screening database does not place a limit in network scaling.

Figure 8:
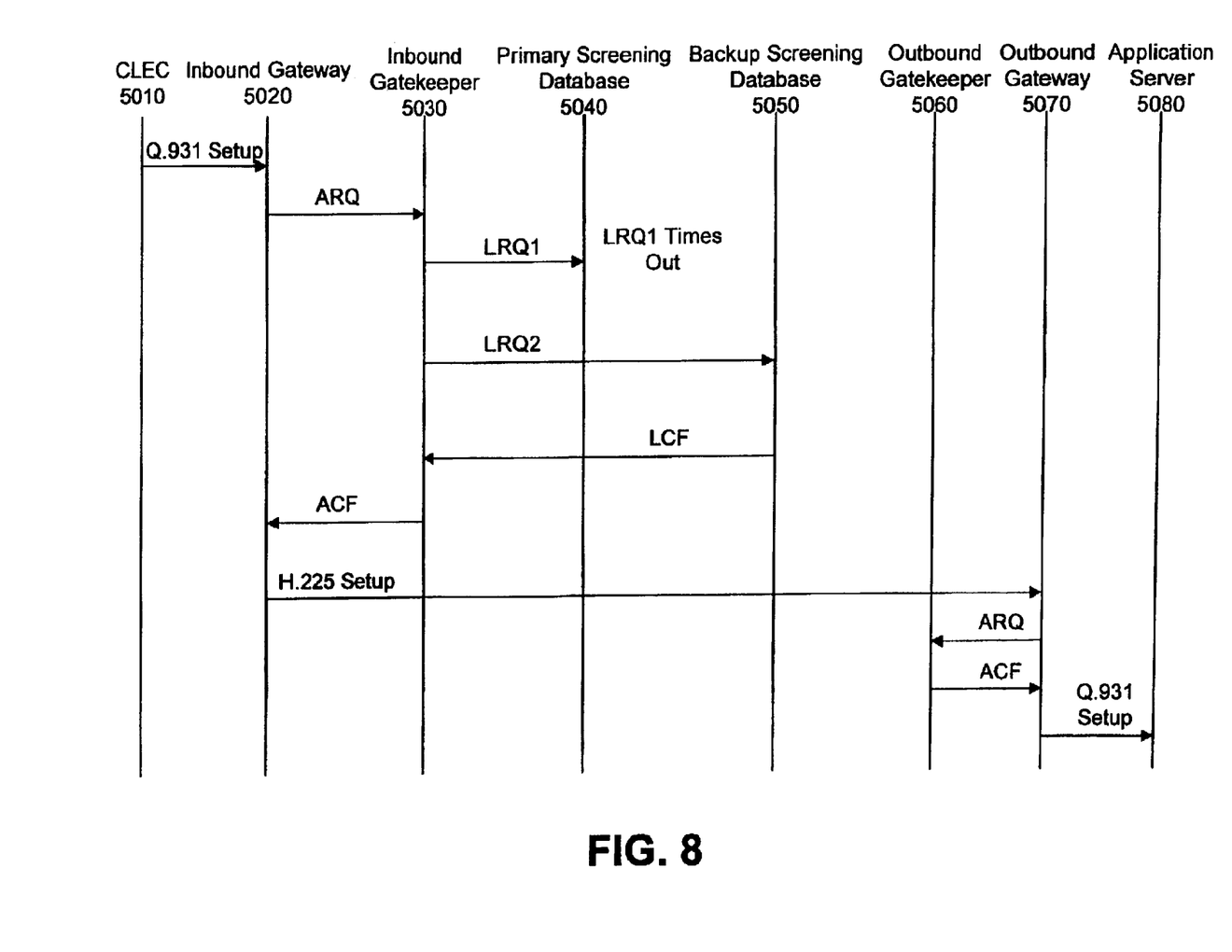
FIG. 8 is a diagram of an exemplary call sequence showing the use of a backup screening database.

FIG. 8 describes an exemplary call sequence similar to that described above with reference to FIG. 7. This call sequence describes one mechanism for implementing redundancy using backup screening database 5050. The call sequence proceeds as described in FIG. 7; however, no LCF message is received from primary screening database 5040. After a predetermined period of time has expired, inbound gatekeeper 5030 sends another LRQ message to the next available screening database 5050. In this example, there are only two databases available; however, any number of screening databases may be provided. The next available database may be determined using any load distribution technique such as those described above with reference to FIG. 4. After the first LRQ message times out, inbound gatekeeper 5030 sends a second LRQ message to backup screening database 5050 which responds with a location confirm (LCF) message. The call setup then continues as described above with respect to FIGS. 6 and 7.

Figure 9:
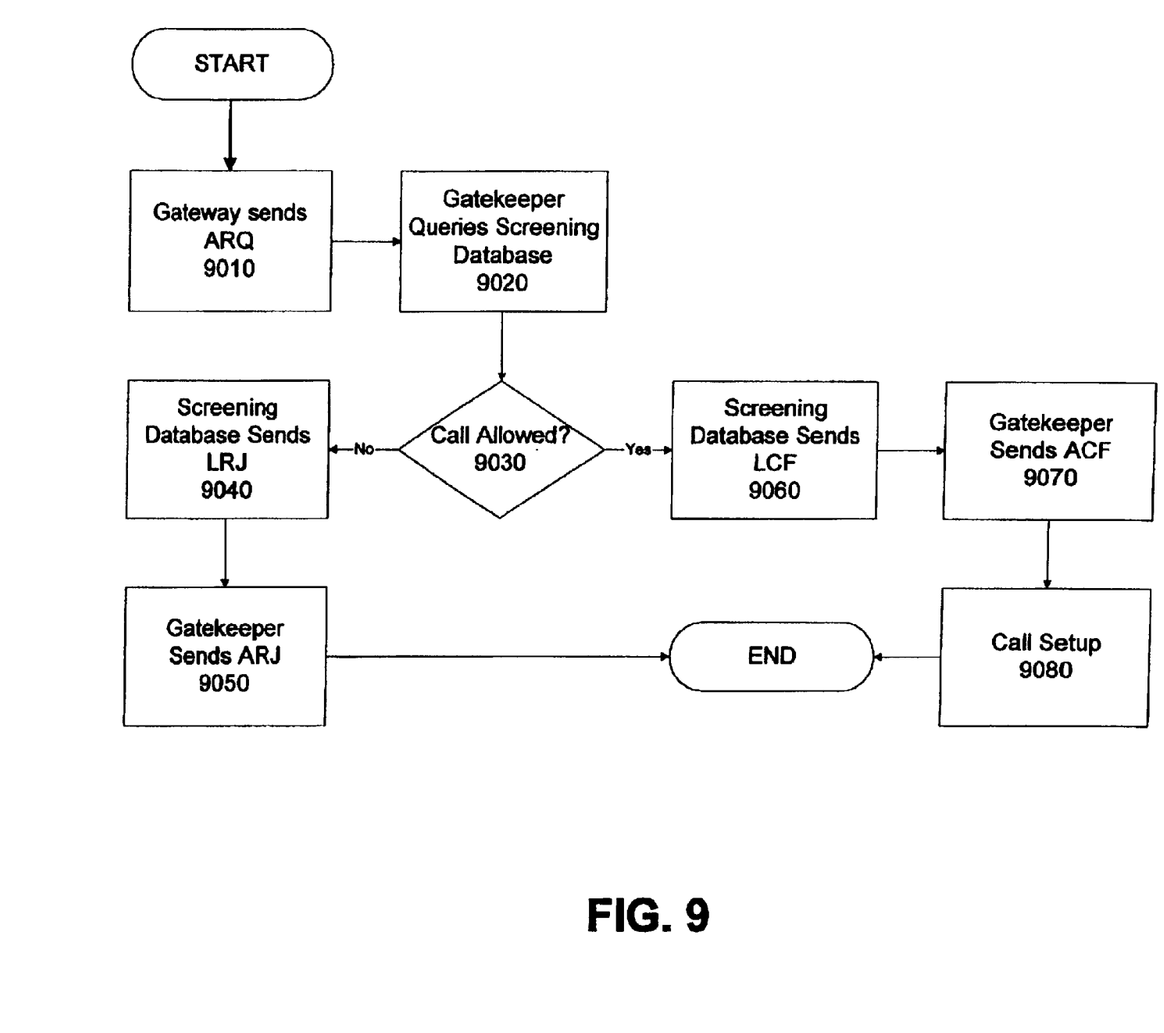
FIG. 9 is a flowchart of the operation of call setup in a packet-based communication system utilizing a screening database.

Referring to FIG. 9, an endpoint device (e.g., telephone computer, and/or cellular phone) attempting to complete a call to another endpoint device sends a message to a gateway initiating a call. The gateway sends (9010) an admission request (ARQ) message to the associated gatekeeper which then queries (9020) a screening database to determine whether an inbound call to a particular called number (DID) is to be allowed into the network; whether the called number should be translated into a different called number; and whether a routing index should be included in the called number to indicate the destination of the call.

If the call is not allowed (9030), the screening database sends a location reject (LRJ) message to the gatekeeper (9040) and the gatekeeper sends an admission reject (ARJ) message to the gateway (9050).

If the call is allowed (9030), the screening database sends a location confirm (LCF) message (9060) to the gatekeeper which in turn sends an admission confirm (ACF) message (9070) to the gateway. The remaining call setup procedures are performed (9080) completing the call.

Figure 10:
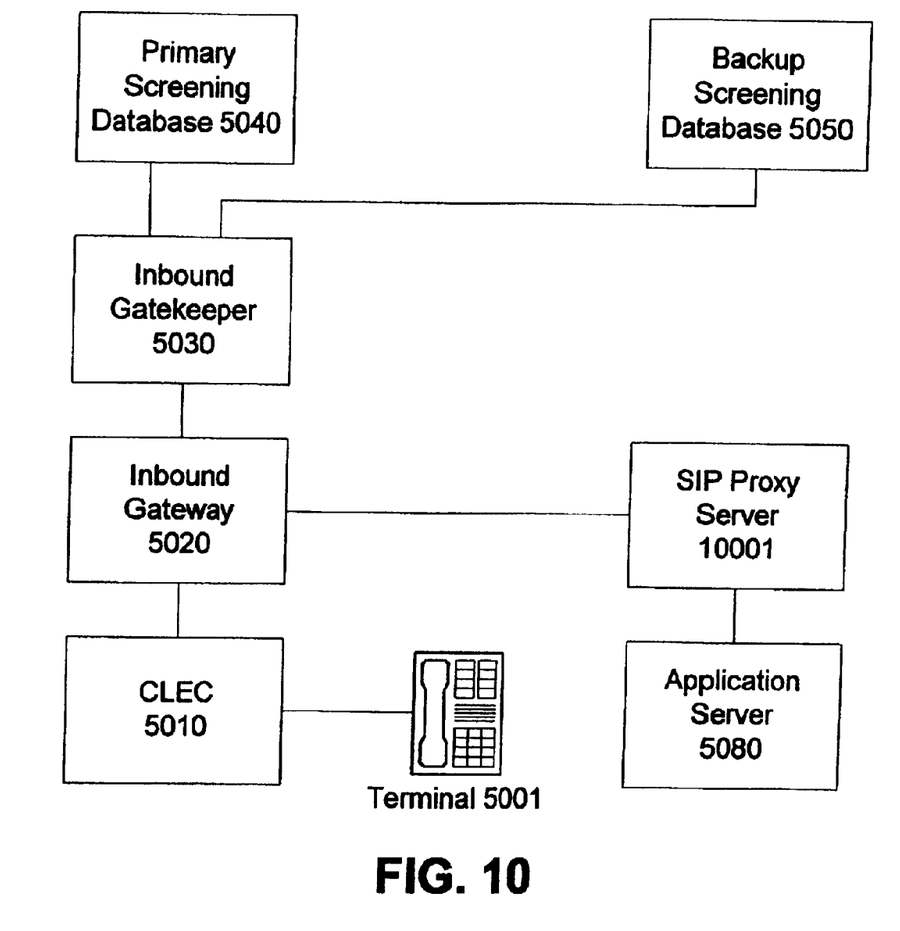
FIG. 10 is a block diagram of a packet-based communication network utilizing a screening database to complete calls to Session Initiation Protocol (SIP) endpoints.

Referring to FIG. 10, a packet-based communication network supporting Session Initiation Protocol (SIP) endpoints includes inbound gateway 5020, inbound gatekeeper 5030, primary screening database 5040, and backup screening database 5050 as discussed above with reference to FIG. 5. Calls to SIP endpoints may be completed through SIP Proxy Server 10001. FIG. 10 shows application server 5080 as a SIP endpoint. In addition, any other communication device may be used as a SIP endpoint. SIP support may be provided in a hybrid packet-based communication network supporting multiple VoIP formats including but not limited to SIP and H.323.

Figure 11:
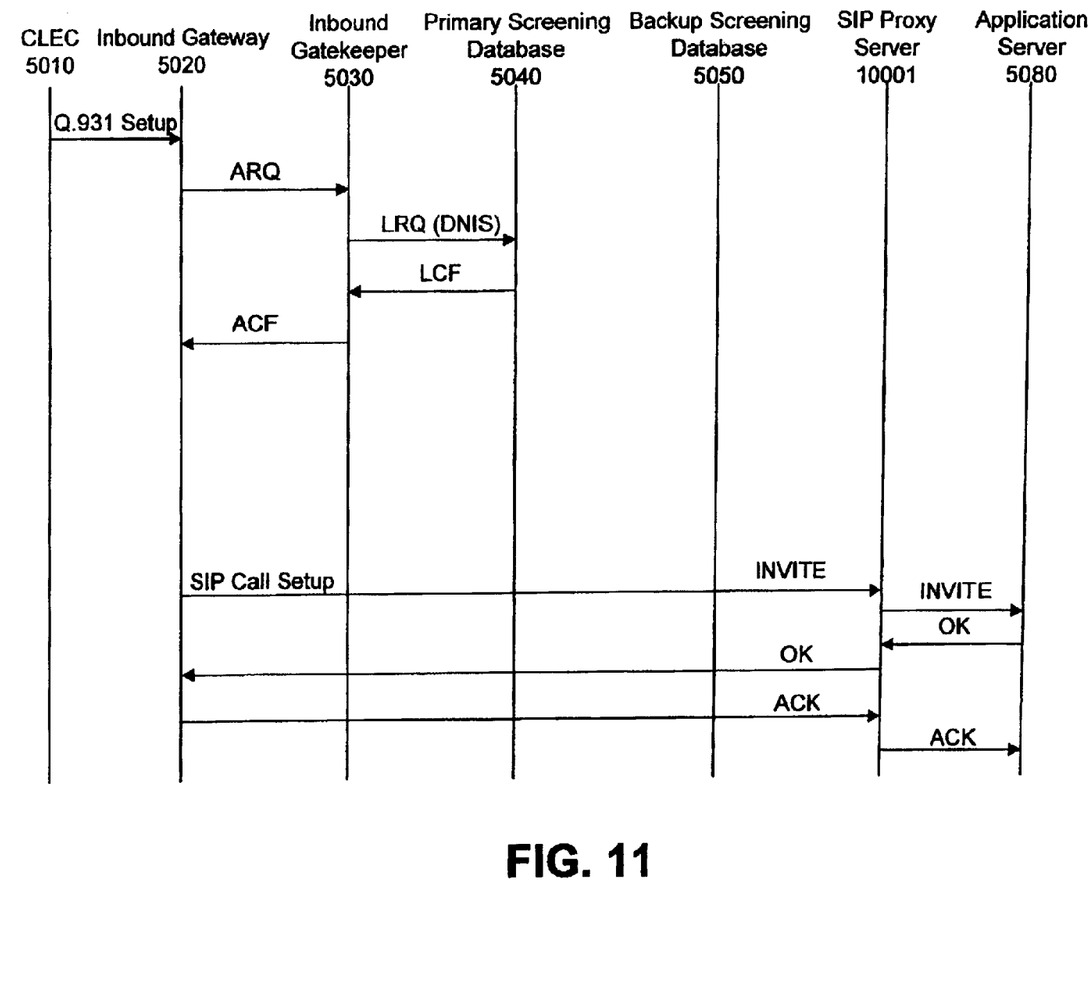
FIG. 11 is a diagram of an exemplary call sequence showing a call screening system supporting SIP endpoints.

Referring to FIG. 11, calls are completed to SIP endpoints using a call sequence similar to that described with reference to FIG. 7. Call screening is performed the same as described above. If the called endpoint is determined to be a SIP endpoint, then a SIP call completion protocol is used instead of an H.323-related protocol. The call screening may indicate that a call is to be completed to a SIP endpoint by specifying a particular routing index. For example, inbound gateway 5020 may be configured to route all calls with a particular routing prefix to SIP proxy server 10001. Then, inbound gateway 5020 sends an invite message to SIP proxy server 10001, which in turn sends an invite message to application server 5080. The application server 5080 returns an "OK" message to the SIP Proxy Server 10001 and then inbound gateway 5020 sends an acknowledge message through SI P proxy server 10001 to application server 5080.

A number of implementations have been described. Nevertheless, it will be understood that various modifications may be made without departing from the spirit and scope of the invention. Accordingly, other implementations are within the scope of the following claims.

What is claimed is:

1. A call screening database system comprising:
   one or more communication devices coupled to a packet-based communication network providing access to a gatekeeper;
   a memory device including a screening database; and
   a processor operable to receive a request from the gatekeeper through the one or more communication devices,
   wherein in response to a received request, the processor performs call screening in conjunction with the screening database, the call screening including one or more of:
   (i) determining whether an inbound call associated with the received request is to be allowed,
   (ii) determining whether a called number associated with the received request translated, and
   (iii) determining whether a routing index should be included in the called number.

2. The call screening database system of claim 1, wherein the processor performs call screening by querying the screening database, determining a response to the received request, and sending the response to the gatekeeper.

3. The call screening database of claim 2, wherein the call screening database is one of a plurality of call screening databases and where said querying of the screening database includes sending a query to a second call screening database of the plurality if no response is received from the first call screening database of the plurality.

4. The call screening database system of claim 1, wherein at least one of the one or more communication devices provides access to a packet-based network.

5. The call screening database system of claim 4, wherein the packet-based network comprises an Internet protocol (IP) network.

6. The call screening database system of claim 1, wherein the memory device comprises random access memory (RAM).

7. The call screening database system of claim 1, wherein the memory device comprises a computer harddrive.

8. The call screening database system of claim 1, wherein the screening database comprises a flat file database.

9. The call screening database system of claim 1, wherein the screening database comprises a relational database.

10. The call screening database system of claim 1, wherein the screening database comprises an object-oriented database.

11. The call screening database system of claim 1, wherein the received request includes a dialed number, and determining a response to the received request includes:
    determining whether the received request is permitted; and
    creating a response number using the dialed number and the received request.

12. The call screening database system of claim 11, wherein sending the response to the gatekeeper includes sending the response number.

13. The call screening database system of claim 11, wherein the response number includes a routing index.

14. The call screening database system of claim 1 wherein the packet-based communication network includes one or more H.323 endpoints.

15. The call screening database system of claim 1, wherein the packet-based communication network includes one or more Session Initiation Protocol (SIP) endpoints.

16. A Voice over Internet Protocol (VoIP) network comprising:
    a first endpoint connected to a packet network;
    a second endpoint connected to the packet network:
    a gateway connected to the packet network; and
    a call screening database device connected to the packet network, the call screening database device having a screening database residing in a memory of the call database device including information to allow the gateway to perform one or more of:
    (i) determining whether an inbound call associated with a received request from the first or second endpoint is to be allowed, (ii) determining whether a called number associated with the received request should be translated, and (iii) determining whether a routing index should be included in the called number.

17. The VoIP network of claim 16 wherein the packet network comprises an Internet Protocol (IP) network.

18. The VoIP network of claim 16 wherein the second endpoint comprises an H.323 endpoint.

19. The VoIP network of claim 16 wherein the second endpoint comprises a Session Initiation Protocol (SIP) endpoint.

20. The VoIP network of claim 16 wherein the call screening database device processes a call by:

receiving a query message requesting the location of the second endpoint;

querying the screening database using information from the query message; and sending a response message based on a result of querying the screening database.

21. The VoIP network of claim 20 wherein the query message and the response message conform to the H.323 protocol.

22. The VoIP network of claim 20 wherein the query message and the response message conform to the Session Initiation Protocol (SIP).

23. A method of screening comprising:

receiving a call request in a gateway coupled to a packet-based communication network:;

processing the call request in conjunction with a screening database residing in a memory of a screening database device, the processing including one or more of (i) determining whether an inbound call associated with the call request is to be allowed, (ii) determining whether a called number associated with the call request should be translated, and (iii) determining whether a routing index should be included in the called number; and routing the call request in accordance with the processing.

24. The method of claim 23 wherein processing the call request includes:

sending a message to a gatekeeper, the gatekeeper processing the message in conjunction with the screening database; and receiving a response to the message from the gatekeeper.

25. A method of screening calls comprising:

receiving a call request in a gateway coupled to a packet-based communication network;

processing the call request in conjunction with a screening database residing in a memory of one of a plurality of screening database devices, where a query message is sent to a first database of the plurality of screening database devices and if no response is received a query message is sent to a second database of the plurality of screening database devices;

wherein the processing including one or more of (i) determining whether an inbound call associated with the call request is to be allowed, (ii) determining whether a called number associated with the call request should be translated, and (iii) determining whether a routing index should he included in the called number; and routing the call request in accordance with the processing.

26. The method of claim 25 wherein the packet-based communication network comprises an Internet Protocol (IP) network.

27. The method claim 25 wherein the call request and/or the query message comprises an H.323compliant.

28. The method claim 25 wherein the call request and/or the query message comprises a Session Initiation Protocol (SIP) compliant.

29. A method of screening calls using a call screening database in a packet-based communication network, the method comprising:

a step for receiving a call request in a gateway;

a step for processing the call request in conjunction with a screening database residing in a memory of a screening database device, the processing including one or more of (i) determining whether an inbound call associated with the call request is to be allowed, (ii) determining whether a called number associated with the call request should be translated, and (iii) determining whether a routing index should be included in the called number; and a step for routing the call request in accordance with the processing.

30. A call screening database device for use in a packet-based communication network comprising:

one or more communication devices providing access to a gatekeeper;

a memory device including a screening database; and a processor operable to receive a request from the gatekeeper through the one or more communication devices, wherein in response to a received request, the processor performs call screening in conjunction with the screening database, wherein the received request includes a dialed number, and determining a response to the received request includes:

determining whether the received request is permitted; and creating a response number using the dialed number and the received request, wherein the response number includes a routing index.

31. The call screening database of claim 30, wherein the call screening database is one of a plurality of call screening databases and where said performance of call screening in conjunction with the screening database includes sending a query to a second call screening database of the plurality if no response is received from the first call screening database of the plurality.

* * * * *